United States Patent [19]
Paus

[11] 3,845,502
[45] Oct. 29, 1974

[54] CASSETTE LOCATING SYSTEM

[75] Inventor: Robert L. Paus, Centerville, Ohio

[73] Assignee: Arvin Industries, Inc., Columbus, Ind.

[22] Filed: Feb. 22, 1973

[21] Appl. No.: 334,698

[52] U.S. Cl. ........................ 360/86, 360/97, 360/133
[51] Int. Cl. ............................ G11b 3/04, G11b 5/00
[58] Field of Search ............. 242/198, 199; 274/4 B, 274/4 H, 11 B; 360/86, 97, 133

[56] References Cited

UNITED STATES PATENTS

| | | | |
|---|---|---|---|
| 3,432,169 | 3/1969 | Schroder | 274/4 B |
| 3,514,050 | 5/1970 | Yamamoto et al. | 242/198 |
| 3,532,292 | 10/1970 | Crandall et al. | 242/198 |
| 3,561,767 | 2/1971 | Negishi | 274/4 C |

*Primary Examiner*—Leonard D. Christian
*Attorney, Agent, or Firm*—Biebel, French & Bugg

[57] ABSTRACT

The cassette in a magnetic disc recording system is supported on a three point support having two locator points and one support pad, any or all of which may be adjustable. The locator points are received in corresponding openings in the cassette, and the cassette is supported thereon and on the pad to locate the cassette precisely in a predetermined position within the disc recording system.

3 Claims, 5 Drawing Figures

PATENTED OCT 29 1974

3,845,502

SHEET 2 OF 2

CASSETTE LOCATING SYSTEM

CROSS REFERENCE TO RELATED APPLICATION

Reference is made to co-pending U.S. application, Ser. No. 305,335 filed Nov. 10, 1972, entitled Magnetic Disc Recorder and Cassette With Compliant Recording Disc, and assigned to the assignee of the present invention.

BACKGROUND OF THE INVENTION

In general, magnetic recording discs can be classified as of the rigid and the flexible or non-rigid type, with the predominance being toward the rigid type which generally comprises a magnetizable coating or surface placed on a rigid plate or platter. Various suggestions have been made for flexible recording discs, but in general these have been of a type where the flexible material was mounted or fastened to a more rigid platter or plate, and various arrangements were provided to move the flexible magnetic disc at some point on its surface toward a magnetic transducer.

The rigid recording discs are expensive and are subject to damage due to "crashes" when the transducer accidentally makes heavy enough contact with the surface so as to mar or scratch the surface, thereby destroying the magnetizable coated surface. Furthermore, it is difficult and expensive to provide such discs which run true in a plane, and continue to do so when exposed to changing conditions of temperature and/or humidity, and which have a uniform magnetizable coating thereon. The mounting and handling of flexible magnetic recording discs has been given little attention. There has been little or no progress in interchangeability of such discs, with the attendant problems of concentricity, proper tracking, proper interfacing between the transducer and the recording surface of the disc, and proper orientation and location of the interchangeable discs within the recording system. On the other hand, there is a need for a relatively inexpensive, but accurate, magnetic disc recorder, and particularly recording disc units which are interchangeable, inexpensive to manufacture, but still accurate enough to achieve high fidelity recording, preferably with bandwidth sufficient to record and reproduce video information, for example, in the order of 2 to 4 MHz. bandwidth.

SUMMARY OF THE INVENTION

The present invention relates to a magnetic disc recorder and a magnetic recording cassette which is of simple and relatively inexpensive construction, which accurately loads, positions, and unloads the recording cassette in a simple but straightforward manner, and which readily accepts inexpensive cassettes interchangeably.

The recorder comprises a slot-loading type of unit in which the cassette is received in a carriage, and the carriage locates the cassette generally with respect to a drive hub. Then by movement of the carriage into playing position the recording disc is accurately positioned and supported by a three point cassette locating system, and coupled to the drive hub. Each of the three points of the locating system may be separately threaded into a support base, and thus vertically adjustable on the threaded support. Two of the supports are locator points which enter openings in the cassette, while the third is a support pad. The pad and locater points support the cassette within the recording system and locate the position of the cassette precisely therein.

The flexible recording disc within the cassette is accessible through an appropriate opening to a transducer which is mounted for movement along a radius of the recording disc, so as to follow different circular paths, or if desired to follow a helical path, under the control of an appropriate motor.

The cassette preferably is constructed of simple rigid or semi-rigid parts defining a cavity within which the thin recording disc is mounted to rotate, being attached to a special driving hub which is accessible through an opening near the center of the cassette. The construction and arrangement of the cassette and the recording disc therein is of such a simple nature that these cassettes can be inexpensively mass produced and still achieve the desired high fidelity recording and reproduction.

The primary object of the invention is, therefore, to provide a novel magnetic disc recorder of simple and efficient design, and to provide a novel magnetic recording cassette locating system, and novel recording cassette, in which the recording cassettes are readily and interchangeably adaptable for use in the recorder.

Other objects and advantages of the invention will be apparent from the following description, the accompanying drawings, and the appended claims.

DESCRIPTION OF THE PREFERRED EMBODIMENT

Figure 1:
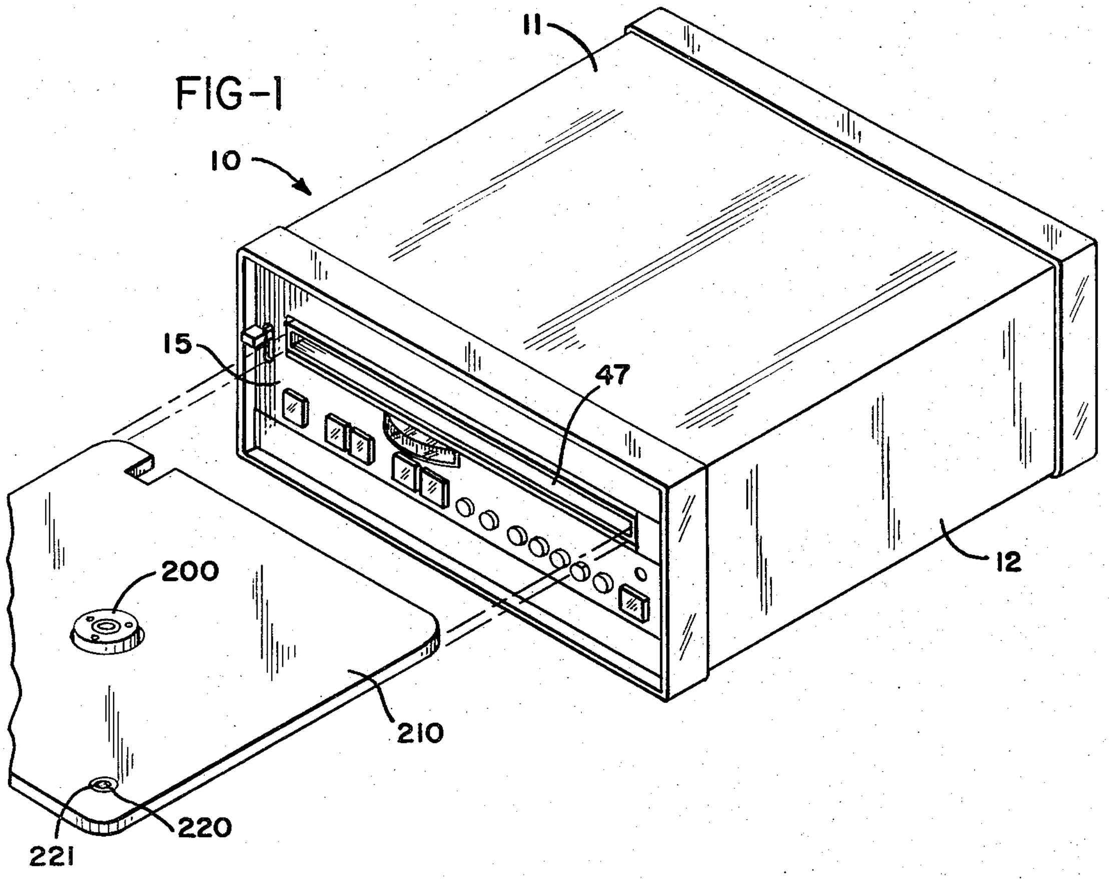
FIG. 1 is a perspective view of a magnetic recording system embodying the invention, showing a cassette which contains a recording media in position to be loaded into the housing of the device.
Figure 2:
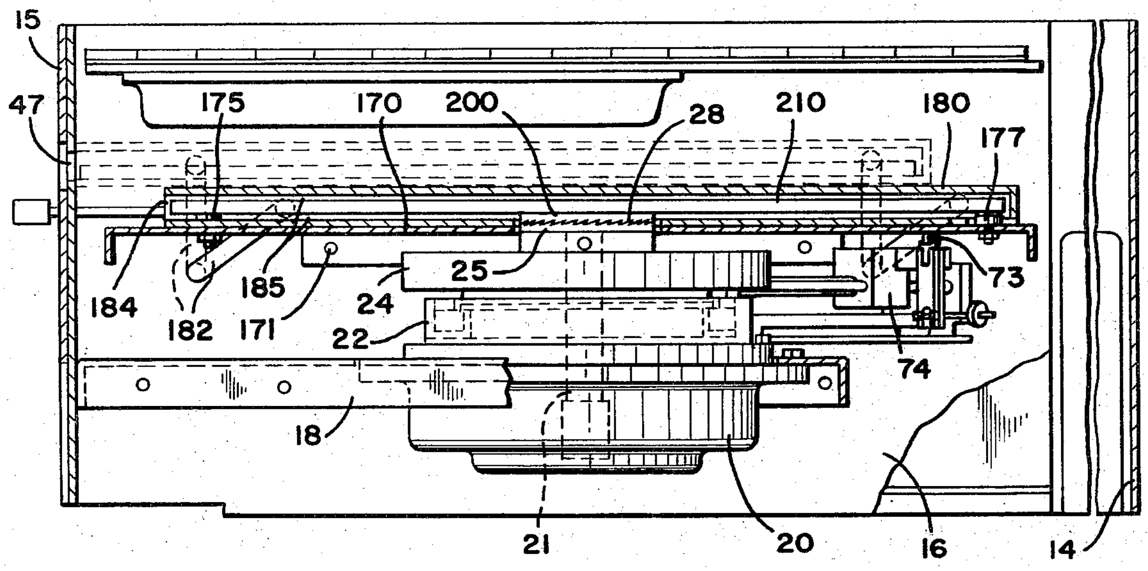
FIG. 2 is a cross-sectional view taken generally through the center of the housing, with some parts broken away or omitted for purposes of clarity.
Figure 3:
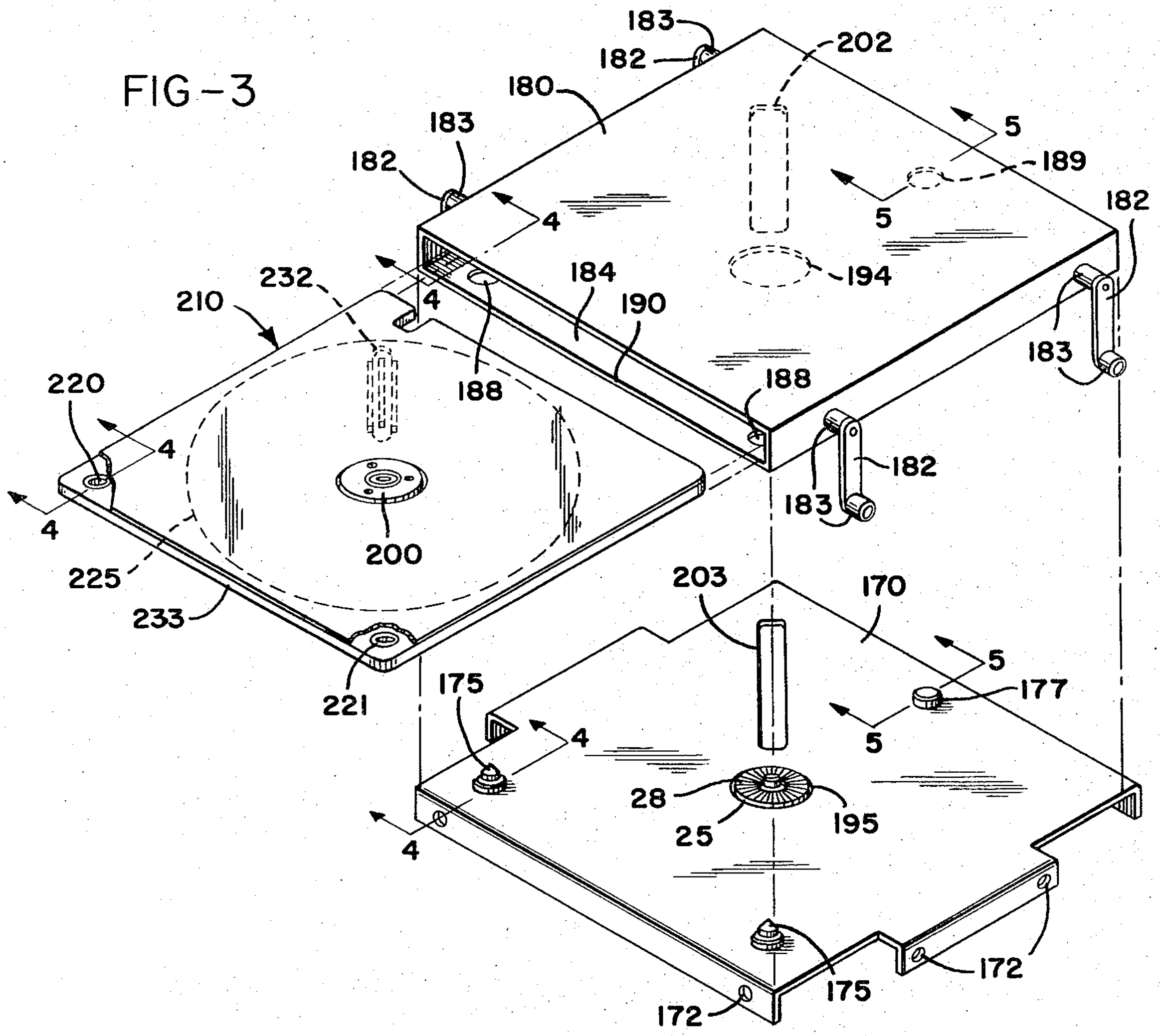
FIG. 3 is an exploded perspective view of the cassette, cassette carriage, and carriage support panel of FIG. 2, showing the three point cassette locating supports on the support panel.

Referring to the drawings, and more particularly to FIGS. 1–2, the recording system provided by the invention is contained within a housing 10 having a top 11, sides 12, a rear panel 14, and a front panel or face 15. Within this structure there is fastened an inner mounting bracket 16 which is generally U-shaped in configuration, with its base portion resting behind the front panel 15, one of its sides adjacent to one side panel 12, and the other of its sides extending front to back of the housing between the sides forming a partial partition. A base panel 18 is secured to all three sides of the bracket 16 and is supported within the housing elevated somewhat above its bottom.

The base panel 18 provides support for a drive motor 20 having an output shaft 21 which extends vertically, its axis of rotation being generally parallel to the front and rear of the housing. Attached to the motor shaft 21 is a tachometer 22 which forms part of a control loop to regulate the motor output speed. Above the tachometer, also fastened to shaft 21, there is a flywheel 24, and immediately above it is the output or drive hub 25. The top or upper face of drive hub 25 has a plurality of radially extending undercut teeth 28 which face coaxially of the shaft 21 arranged in a circle around the face of drive hub 25. These teeth rotate in a fixed plane when motor 20 is running, and the elements of a recording cassette are brought into contact with the drive hub, as will be explained.

Immediately above the motor and its drive hub there is a cassette receiving carriage 180 which comprises top and bottom walls secured together to define a thin elongated chamber 185 into which a thin rectangular, preferably square, cassette 210 may be inserted. Details of the cassette are described more fully in copending U.S. application Ser. No. 305,335, filed Nov. 10, 1972, assigned to the assignee of the present invention, and for purposes of the present explanation, it should merely be noted that the cassette includes an exposed rotatable driven hub 200, also having undercut teeth, the driven hub constructed as a complement to the driving hub 25 so that the two hubs may readily engage for the purpose of moving a recording media within the cassette 210. In one successful embodiment, the cassette 210 was constructed as a hollow essentially rigid member of about thirteen inches square, having a thickness of about one-quarter inch.

Referring to FIG. 2, a transducer 73, preferably in the form of a single magnetic recording/playback head having a very narrow width and a small gap width in the order of 40 microinches, is mounted for cooperation with the recording media within the cassette 210 when the carriage supports the cassette in the playing position as shown particularly in FIG. 2. The transducer 73 is suitably mounted on an appropriate positioning mechanism 74 on the base panel 18 in spaced relation to drive hub 25. Positioning mechanism 74 moves transducer 73 controllably to selected positions along a path toward and away from the drive hub. A suitable such transducer positioning mechanism is disclosed in copending U.S. application Ser. No. 305,355, filed Nov. 10, 1972.

FIGS. 2–5 illustrate the locating system for supporting and locating the cassette 210 within housing 10. A carriage support panel 170 (FIGS. 2 and 3) is attached to the inner mounting bracket 16 by screws 171 which pass through screw holes 172 in panel 170. Panel 170 has two locator points 175 threadably mounted on threaded shafts 176 near the front of panel 170. The locator points may be adjusted vertically with respect to panel 170 by turning the points inwardly or outwardly on their shafts 176. A corresponding support pad 177 is similarly threaded into panel 170 on a shaft 178 near the rear of the panel. Points 175 and pad 177 form a vertically adjustable three point locating and support system on the carriage support panel 170.

The cassette carriage 180 is attached to bracket 16 of housing 10 by means of parallel arms 182 having appropriate bushings 183 thereon. Arms 182 support the carriage for movement between a lower operative position (solid lines in FIG. 2) in which carriage 180 rests upon carriage support panel 170 and an upper or loading position (dotted lines) in which the opening or loading slot 184 into the carriage chamber 185 is brought adjacent the housing loading opening 47 for insertion and removal of the tape cassette.

The cassette carriage 180 has a pair of locator point openings 188 and a support pad opening 189 in the bottom 190 of the carriage, opposite the corresponding locator points 175 and pad 177, allowing the points and pad to pass into the carriage chamber 185 when the carriage rests upon support panel 170. The cassette carriage 180 and carriage support panel 170 also have respective drive hub openings 194 and 195 to provide access for the drive hub 25 to the corresponding cassette driven hub 200 within the chamber 185. Similarly, transducer access slots 202 and 203 in the carriage 180 and panel 170, respectively, provide access for the transducer 73 to the cassette recording disc.

Figure 4:
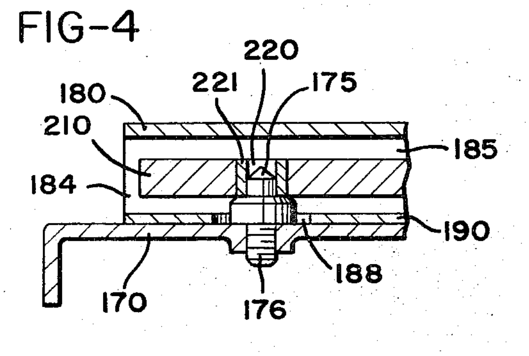
FIG. 4 is a cross-sectional view taken on lines 4—4 of FIG. 3, and showing the carriage in the lowered position resting on the carriage support panel and the cassette therein being supported and located on one of the vertically adjustable points of the three point cassette locating system.
Figure 5:
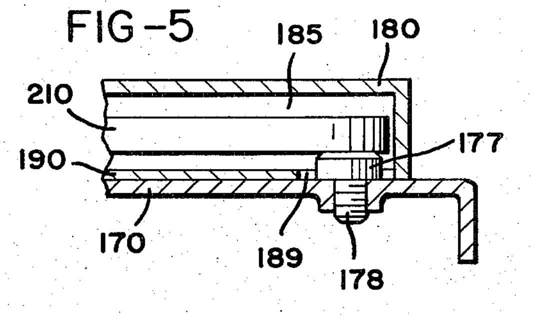
FIG. 5 is a cross-sectional view similar to FIG. 4 taken on lines 5—5 of FIG. 3.

The tape cassette 210 includes locator receiving openings 220 having metallic liners 221. Openings 220 are located in the cassette near the front corners thereof to receive the locator points 175 of the cassette support system when the cassette is placed within carriage chamber 185 and lowered into the operative position adjacent carriage support panel 170 (FIGS. 2, 4, and 5). The carriage chamber 185 is of a height greater than the thickness of the cassette 210 so that the three point support system 175 and 177 may lift the cassette off the floor of the carriage and support the cassette entirely independently of the carriage 180. By this means the cassette may be located very precisely with respect to the base panel 18 on which the drive motor 20, drive hub 25, and transducer 73 are mounted. The vertical position is adjusted by turning the supports 175 and 177 inwardly or outwardly of the support panel 170, and the horizontal position of the cassette 210 is precisely determined by entry of the locator points 175 into the metallic liners 221. The fit of the locator points 175 and support pad 177 in panel 170 should therefore be tight in order to maintain these points in the proper vertical adjustment.

The cassette internal chamber 225 houses the recording media disc 230. The recording media disc 230 is quite thin and in a static (not rotating) condition it is incapable of sustaining itself in a plane. A typical material used for this purpose is standard recording tape, which may be of a specially prepared type as disclosed in copending U.S. Pat. application Ser. No. 224,187, filed Feb. 7, 1972, and having a thickness of about 1 mil (0.001 inch). The recording disc 230 is made accessible to the transducer 73 through a transducer access slot or opening 232 passing through the cassette lower cover portion 233. Further details of the construction of this and other suitable cassettes are disclosed in copending U.S. application Ser. No. 183,856, filed Sept. 27, 1971, and copending U.S. application Ser. No. 305,335, filed Nov. 10, 1972, both assigned to the assignee of the present application.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a magnetic recording system including a support panel, a drive hub mounted in the support panel, means for rotating the drive hub, a magnetic transducer movably mounted in spaced relation to the drive hub and movable to selected positions along a path toward and away from the drive hub, a recording disc having at least one magnetizable surface, a cassette surrounding the disc and having an elongated opening therein adjacent the magnetizable surface and aligned with the path of movement of the transducer providing access for the transducer to the surface, a driven hub attached to the disc and accessible adjacent the surface of the cassette to the drive hub, the improvement comprising:

locating means including a plurality of support points on the support panel and corresponding receiving means on the cassette, the cassette resting upon and being located by said support points and receiving means to locate and support the cassette in a predetermined position on the support panel to align the drive hub with the driven hub and to align the elongated opening with the transducer, and a carriage movable between a loading position and an operating position and constructed to hold the cassette, said carriage having openings to allow said support points to pass into the carriage to support and locate the cassette thereon.

2. A magnetic recording system as defined in claim 1 wherein said locating means is vertically adjustable and includes at least two locator points received in corresponding receiving openings in the cassette to locate the cassette in said predetermined position on the support panel.

3. In a magnetic recording system including a support panel, a drive hub mounted in the support panel, means for rotating the drive hub, a magnetic transducer movably mounted in spaced relation to the drive hub and movable to selected positions along a path toward and away from the drive hub, a recording disc having at least one magnetizable surface, a cassette surrounding the disc and having an elongated opening therein adjacent the magnetizable surface and aligned with the path of movement of the transducer providing access for the transducer to the surface, a driven hub attached to the disc and accessible adjacent the surface of the cassette to the drive hub, the improvement comprising:

a. first locator point means,
b. second locator point means;
c. first and second threaded means mounting said locator points on the support panel for vertical adjustment with respect to the support panel in response to rotation on said threaded means,
d. locator pad means,
e. third threaded means mounting said locator pad on the support panel for vertical adjustment with respect thereto in response to rotation on said third threaded means, and
f. first and second openings in the cassette for receiving said first and second locator points to support the cassette thereon and on said pad to locate the cassette in a predetermined position on the support panel.

* * * * *

PO-1050
(5/69)

UNITED STATES PATENT OFFICE
CERTIFICATE OF CORRECTION

Patent No. 3,845,502 Dated October29, 1974

Inventor(s) Robert L. Paus

It is certified that error appears in the above-identified patent and that said Letters Patent are hereby corrected as shown below:

Column 3, line 47, "delete 305,355" and insert --305,335--.

Signed and sealed this 31st day of December 1974

(SEAL)
Attest:

McCOY M. GIBSON JR.
Attesting Officer

C. MARSHALL DANN
Commissioner of Patents